(No Model.)  3 Sheets—Sheet 1.
V. LAHOLA.
PHONOGRAPH.
No. 479,431.  Patented July 26, 1892.
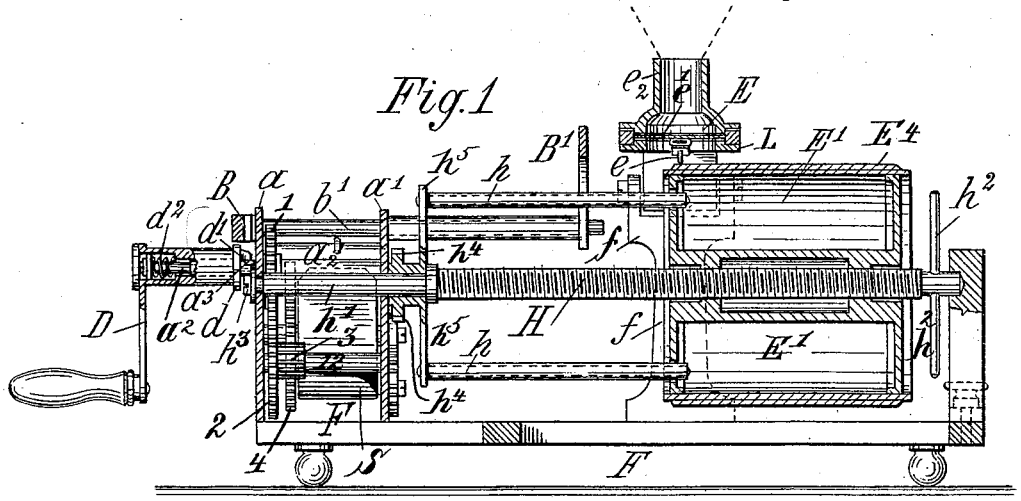
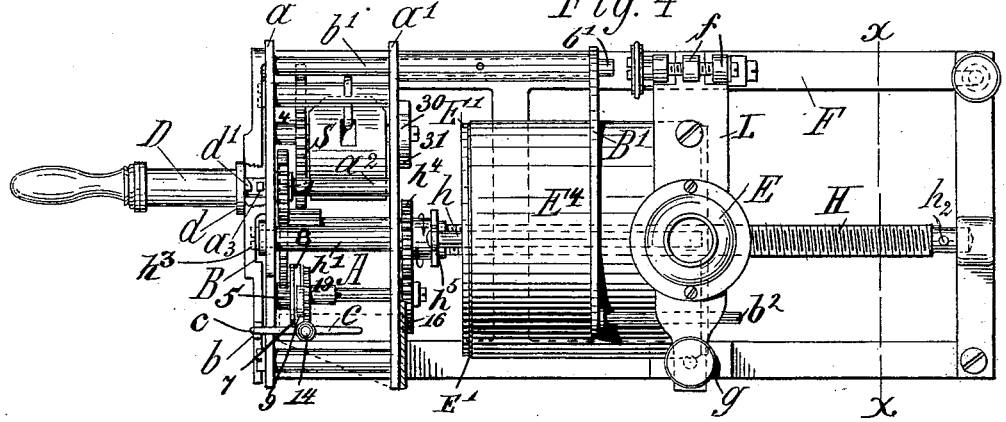
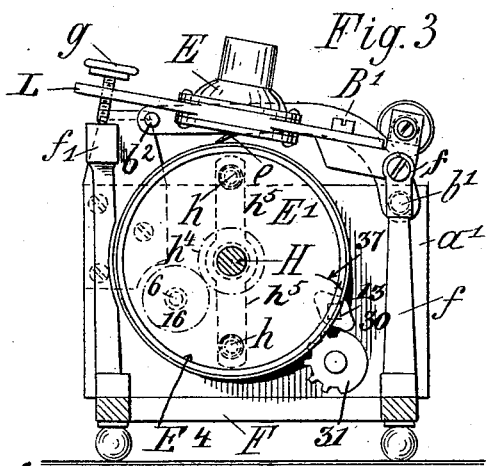
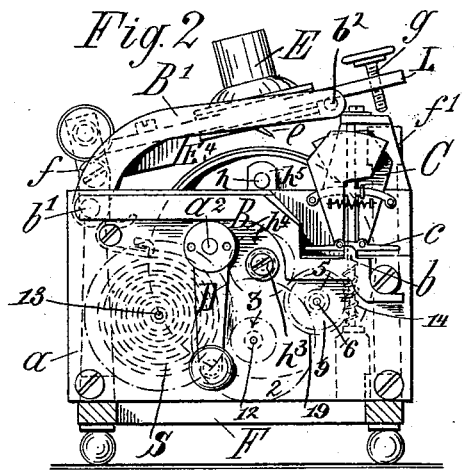
Witnesses:
H. G. Dieterich
B. W. Sommers
Inventor
Vinzenz Lahola
by Geo. Orth Atty.

(No Model.) 3 Sheets—Sheet 2.

V. LAHOLA.
PHONOGRAPH.

No. 479,431. Patented July 26, 1892.

Witnesses:
H. S. Dieterich
B. W. Sommers

Inventor:
Vinzenz Lahola.
by [signature] Atty.

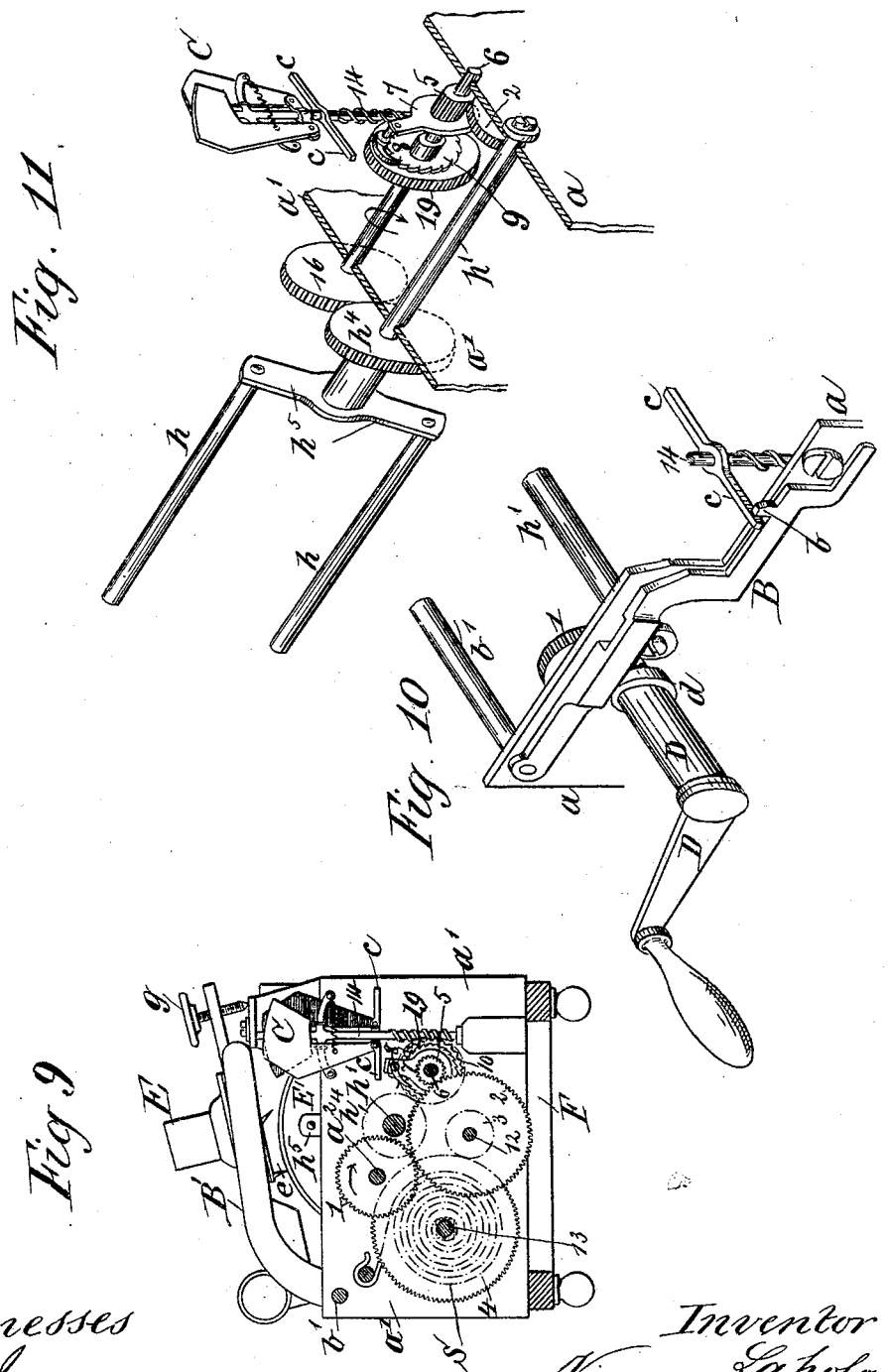

UNITED STATES PATENT OFFICE.

VINZENZ LAHOLA, OF VIENNA, ASSIGNOR TO BELA STEINER, OF BUDA-PESTH, AUSTRIA-HUNGARY.

PHONOGRAPH.

SPECIFICATION forming part of Letters Patent No. 479,431, dated July 26, 1892.

Application filed July 11, 1891. Serial No. 399,190. (No model.)

*To all whom it may concern:*

Be it known that I, VINZENZ LAHOLA, a subject of the Emperor of Austria-Hungary, residing at Vienna, in the Province of Lower Austria, in the Empire of Austria-Hungary, have invented certain new and useful Improvements in Phonographs; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to phonographs, and has for its object certain improvements applicable to phonographs in which the phonogram-carrier is driven by a spring or like motor requiring to be wound up, and certain improvements applicable to phonographs generally.

The invention consists in structural features and in combinations of co-operative elements, as will now be fully described, reference being had to the accompanying drawings, in which—

Figure 6:
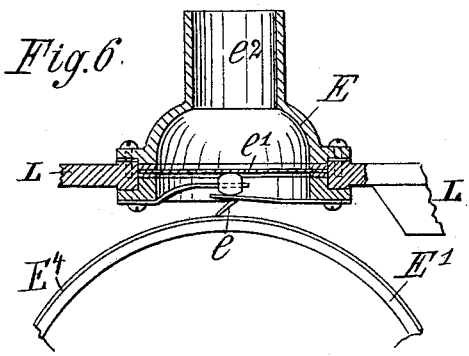
Figure 5:
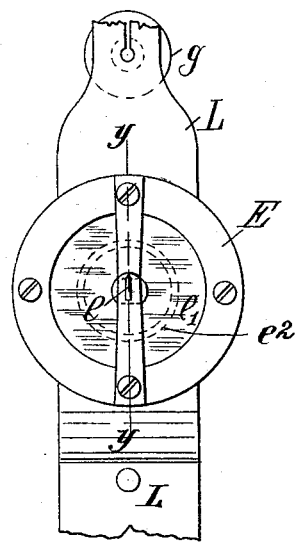
Figure 8:
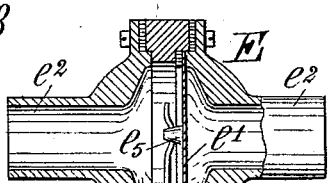
Figure 7:
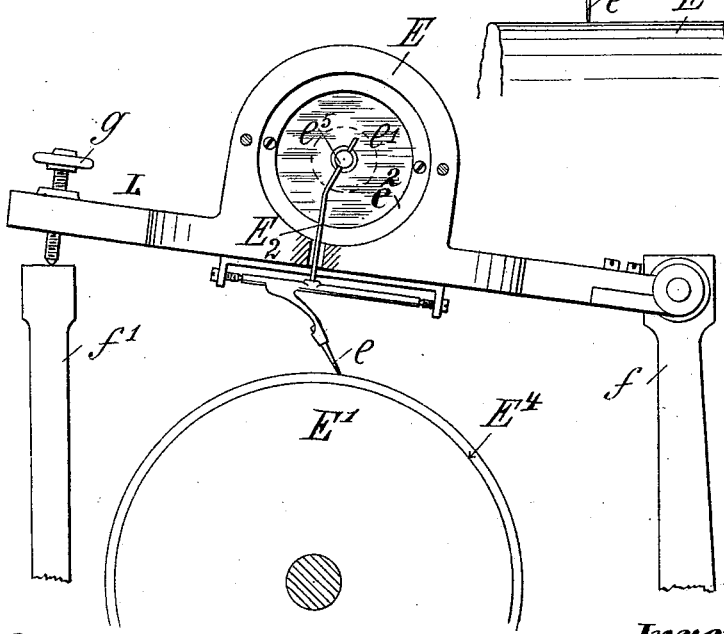

Figure 1 is a longitudinal sectional view, Fig. 2 a left-hand end elevation, Fig. 3 a cross-section on line $x\,x$ of Fig. 4, and Fig. 4 a top plan view, of a phonograph embodying some of my improvements. Fig. 5 is an under side view of the producer or reproducer and part of its supporting-lever. Fig. 6 is a sectional view thereof, taken on line $y\,y$ of Fig. 5. Fig. 7 is a sectional elevation illustrating my improvements in the construction of the producer or reproducer and its arrangement relatively to the blank or phonogram cylinder carrier, and Fig. 8 is a sectional view thereof. Fig. 9 is a sectional end elevation of the phonograph, showing the motor. Fig. 10 is a perspective view of the stop mechanism for the motor governor or fly, and Fig. 11 is a like view of a portion of the motor.

Similar symbols indicate like parts wherever such may occur in the above-described figures of drawings.

The carrier for the phonogram-blank or for the phonogram may be revolved by any suitable motor, and in the drawings I have shown a spring-motor, with which I have combined means whereby the revolution of the carrier is automatically stopped as soon as the motor is about to run down and whereby the overwinding of the motor-spring is avoided.

Referring more particularly to Figs. 2, 9, 10, and 11, on the winding-arbor $a^2$ is secured a gear-wheel 1, that meshes with a wheel 2 on an arbor 12, which latter also carries a pinion 3 in gear with a wheel 4 on the arbor 13 of the motor-spring S, whose ends are respectively secured to said arbor 13 and to a pin secured to the frame-plates $a$ and $a'$. By means of the described gearing the spring S is wound up by the revolution of the arbor $a^2$. The gear-wheel 2 also meshes with a pinion 5 on an arbor 6, which latter carries a radial arm 7, that has pivoted thereto a pawl 8 in perpetual engagement with the teeth of a ratchet-wheel 9, formed integral with or rigidly secured to a worm-wheel 19, in gear with a spirally-threaded portion of the governor or fly spindle 14. The ratchet 9 and worm-wheel 19 are loosely mounted on arbor 6, which latter also carries a pinion 16, in gear with a pinion $h^4$ on arbor $h'$, that carries the radial arms $h^5$, to which the rods $h$, that revolve the blank or phonogram carrier, are secured, as hereinafter explained. It will thus be seen that when the motor-spring S is wound up the arbor 6 will be revolved, thereby revolving the blank or phonogram carrier, returning the same to its starting-point. Inasmuch as the ratchet-wheel 9 and worm-wheel 19 are loosely mounted on the arbor, and inasmuch as the spindle 14 for the governor or fly of the motor is locked against rotation during said winding up, as will be described presently, the pawl 8 will ride idly over the teeth of ratchet 9, the arbor 6 revolving in the direction of the arrow, Fig. 11.

The winding-arbor $a^2$ has a radial lug $a^3$, Figs. 1 and 4, and has its outer end attenuated. On the attenuated end of the arbor $a^2$ is mounted a coiled spring $d^2$, that has bearing upon a collar at the end of said attenuated portion of the arbor and upon an annular shoulder formed within the barrel of the winding-key D, said barrel having at its end a flange or collar $d$, from the inner face of which projects a lug $d'$, adapted to engage the lug $a^3$ on arbor $a^2$ and carry the same along when the key is revolved. As is readily seen, the spring $d^2$ on arbor $a^2$ tends to move the key D, with its lug $d'$, into engagement with the lug $a^3$ on arbor $a^2$, thereby insuring the revolution of the latter arbor when the lugs are in engagement and the key is revolved in the proper direction for the purpose of winding up the motor-spring S. When the motor is in operation, however, the lug $d'$ on key D is held out of engagement with the lug $a^3$ on arbor $a^2$, as will be described.

The arbor for the motor-spring, as well as all the arbors for the train of gearing described, have their bearings in frame-plates $a$ and $a'$, and in said plates is also pivoted a shaft $b'$, that serves as a fulcrum for two levers B and B', respectively. The lever B is secured to the shaft $b'$ at the left end outside of the end frame plate $a$ in such a position as to lie on the collar $d$ of the winding-key when said key has been moved inwardly to bring its lug $d'$ into engagement with the lug $a^3$ on the winding-arbor $a^2$ whenever it is necessary to wind up the motor-spring, or said lever B may be interposed between the collar $d$ and frame-plate $a$ to hold the said lugs out of engagement with each other when the motor is running.

The lever B has near its free end a projection $b$, and on the spindle 14 of the governor or fly of the motor are secured two radial arms $c$ $c$.

When the lever B is interposed between the collar $d$ of the winding-key and the frame-plate $a$, the motor is free to operate, the projection $b$ on lever B then occupying a position below the arms $c$ $c$. When, however, it is desired to stop the motor, either for the purpose of winding up the motor-spring S, or for any other purpose, the lever B is lifted from between the collar $d$ and frame-plate $a$ sufficiently to allow the key D to be moved toward said frame-plate, so that the lever B will rest on said collar, in which position the projection $b$ on said lever will lie in the path of the arms $c$ $c$ on the governor-spindle and arrest the motion thereof, and consequently the operation of the motor, as will be readily understood and as can be clearly seen by an inspection of Figs. 2, 5, 9, 10, and 11.

In order that the motor may be automatically stopped when the motor-spring S is nearly unwound and in order to avoid overwinding of said spring, the arbor 13 of the spring carries a double-toothed cam 30, Fig. 3, whose teeth alternately engage the teeth of mutilated gear 31 as the spring-arbor revolves, thereby revolving the said mutilated gear also, the number of teeth on the gear being such that after a given number of revolutions of the arbor 13 in one or the other direction one of the teeth of the cam 30 will impinge upon the untoothed portion of the mutilated gear, whereby the further rotation of the arbor 13 is prevented, but said arbor is free to revolve in an opposite direction. Supposing that the spring is unwound, or nearly so, when the cam 30 and gear 31 are in the relative positions shown in Fig. 3, it is obvious that said arbor is held against rotation in the direction of arrow 37, but not in a reverse direction, so that said spring may be wound up, and when nearly fully wound one of the teeth of cam 13 will again come in contact with the untoothed portion of the gear to prevent the arbor 13 from further rotation.

By the devices described the motor is automatically stopped as soon as the motor-spring is unwound or wound up again, while the said motor may be locked against operation at any time through the medium of the lever B, by means of which the winding-key is also thrown out of operation.

The blank or phonogram carrier cylinder E' has screw-threaded bearings and is mounted on a correspondingly-threaded shaft H, as usual, the unthreaded left end $h'$ of which has its bearings in the motor-frame plates $a$ and $a'$, said unthreaded portion having an interiorly-threaded socket in its end for the reception of a locking or binding screw $h^3$, Fig. 2, by the loosening of which screw the shaft may be adjusted about its axis, for purposes hereinafter explained, the shaft being provided with suitable handles $h^2$.

On the shaft H is loosely mounted the pinion $h^4$, from whose hub project two radial arms $h^5$, to each of which is secured a rod $h$, hereinbefore referred to, that extends through suitable holes in the left-hand head of the carrier-cylinder E', the said pinion being driven by the winding-up gear, so that in winding the motor-spring the carrier E' is returned to its normal position—that is to say, from its position shown in Fig. 1 to its position shown in Fig. 4.

The producer and reproducer E is secured to a lever L, that is fulcrumed or pivoted to a post $f$, rising from the main frame F of the phonograph, and carries at its outer end an adjusting-screw $g$, by means of which the degree of contact between the producing or reproducing point $e$ and the blank or phonogram cylinder is regulated. In winding up the motor-spring it is desirable that this contact should be interrupted to avoid wear of the record, and to this end the shaft $b'$ carries at its right-hand end the lever B', hereinbefore referred to, from the free end of which projects a pin $b^2$, that extends under the outer or free end of the producer and reproducer carrier-lever L.

It will readily be seen that when the lever B is lifted onto the flange $d$ of the key-barrel the lever B' is also lifted, thereby lifting lever L and the producer or reproducer and interrupting the contact between the point or style $e$ and the blank or phonogram cylinder E'. On the other hand, when the key D is drawn outwardly against the stress of its spring to disengage the lug $d'$ from the lug $a^3$ on the winding-arbor the lever B, as well as the lever B', drop, thereby starting the motor and re-establishing the contact between the point or style $e$ and the blank or phonogram cylinder, said lever B preventing the key D from again moving inward, thus allowing the motor to drive the carrier E' until said lever B is again lifted or until the motor has run down. It is therefore not possible to arrest the motor and wind the motor-spring without interrupting the contact between the blank or phonogram cylinder and the point $e$ or start said motor without re-establishing the contact.

In phonographs as heretofore constructed the driving-shaft that drives the blank or phonogram cylinder or that moves the producing or reproducing point has about one hundred threads to the inch to avoid loss of space. It is not only very difficult and tedious to cut so fine a thread, but as a rule these driving-shafts have been made very slender and comparatively short to avoid any deviation thereof from a straight line. It is of course desirable, especially when the carrier is moved longitudinally instead of the producer or reproducer, to provide a sufficiently-strong supporting-shaft, and to avoid the necessity of cutting a very fine thread on such a shaft I make the same adjustable about its axis, so that the blank or phonogram cylinder may be properly adjusted for the production or reproduction of the phonogram tracks or threads between the track or thread of a phonogram traced thereon. By these means any desired pitch within certain limits may be given to the screw-thread on the shaft H, so that in producing or reproducing a phonogram after a line or thread of the record has been produced or reproduced a partial revolution may be imparted to the shaft H, while the carrier remains stationary, so that the producing or reproducing point will register with the space between the first record track or thread, and this may be repeated as many times as the space between the first record track or thread will permit. I am thus enabled to obtain with a comparatively coarsely-threaded shaft a record the tracks of which are as close together if not closer than those obtained with a finely-threaded shaft, as will be readily understood.

In phonographs as heretofore constructed the producer or reproducer has been arranged so that the producing or reproducing diaphragm lies in a plane tangential to the blank or phonogram cylinder, the sound being transmitted to and from one side of said diaphragm. I have found that the vibrations of the diaphragm in producing and the reproduction of the sound in reproducing can be greatly intensified by transmitting the sound to and from both sides of the diaphragm, and this arrangement I have shown in Figs. 7 and 8.

The producer or reproducer E, as shown, is arranged with its longitudinal axis parallel with the shaft H, and consequently parallel with the longitudinal axis of the blank or phonogram cylinder, the diaphragm $e'$ being secured in the casing, so as to lie in a plane at right angles to the shaft H, said casing being provided with two branches $e^2 e^2$, leading to the opposite sides of the diaphragm for the connection of the mouth or ear piece or pieces. In producing, the connecting-tube will be provided with two branches leading to a single mouthpiece, while in reproducing, two tubes, each provided with an ear-piece, may be connected with the branches $e^2$ instead of a branched tube, as has been the case heretofore. In this manner the sound has been transmitted to or from both sides of the diaphragm, the vibrations or sound reproductions of which being greatly intensified, the reproduced sounds being more distinct, clear, and sharp than is the case with a reproducer arranged as usual.

The vibrations of the diaphragm $e'$, instead of being transmitted directly to the producing-point, as is the case in phonographs as now constructed, are transmitted to an intermediate element—as, for instance, a rock-shaft—to which the producing or reproducing point is secured and which may be called the "point-holder," which shaft or holder is adapted to be oscillated or rocked by the diaphragm. The holder, as shown, is centered on cone-screws and connected with the diaphragm by a connecting rod or wire $E^2$, secured in a button $e^5$, attached centrally to said diaphragm, said holder having an arm provided with a sleeve for the reception of the producing or reproducing point $e$, said sleeve being made tapering, so that the point may be firmly pressed into and held therein. It is obvious that the point $e$ may be directly connected with and vibrated by the diaphragm $e'$; but the provision of a holder for the point admits of the interchangeable use of producing and reproducing points. This feature is of great importance in such cases where the record is to be repeatedly reproduced, as it is well known that if the producing-point is used for reproducing the record the latter will soon wear away and be obliterated entirely. If, however, a reproducing-point narrower than the record track or thread is employed this is not the case, as the sounds will be reproduced provided the point is in contact with the bottom of the track, so that if the latter is made comparatively wide—as, for instance, by a chisel-point—and a pointed reproducing-point is used there is not only considerable margin for adjustment, but the track is not so liable to be obliterated. In these adjustments the advantages of supporting the producer and reproducer from a lever and providing the adjusting-screw $g$ will be readily understood.

Having thus described my invention, what I claim as new therein, and desire to secure by Letters Patent, is—

1. In a phonograph, the combination, with the blank or phonograph cylinder carrier, of a producer or reproducer arranged above said carrier and comprising a casing, a diaphragm arranged therein with its axis parallel to the axis of rotation of the cylinder, two sound-ducts leading to opposite sides of the diaphragm, a stylus-carrier adapted to rock in bearings on the under side of said casing, said stylus-carrier being connected with the diaphragm by an arm $E^2$, a hinged support for said producer or reproducer, and an adjusting device for adjusting the same relatively to the phonograph-carrier, substantially as and for the purpose set forth.

2. The combination, with a revoluble carrier for the blank or phonogram cylinder, said carrier being provided with interiorly-threaded bearings, of a stationary screw-shaft adjustable about its own axis, for the purpose set forth.

3. The combination, with the blank or phonograph carrier, its motor, the producer or reproducer arranged above said carrier, and a hinged support for said producer or reproducer, of two connected levers adapted to stop the motor and simultaneously lift the producer or reproducer support from the carrier.

4. The combination, with the blank or phonogram cylinder carrier, its motor, and the producer or reproducer, of two levers adapted to operate jointly to stop the motor and move the producer or reproducer away from the carrier, for the purpose set forth.

5. The combination, with the blank or phonogram carrier, its motor, the winding-shaft thereof, the winding-key having endwise motion on the shaft, and interlocking devices connected with the shaft and key to interlock the same, of a lever having bearing on the winding-key at or about at its point of interlocking with the winding-shaft and adapted to drop on said winding-shaft when the key is moved out of engagement therewith, said lever being provided with a projection in the path of the governor or fly of the motor when said lever rests on the winding-key, for the purposes specified.

6. The combination, with the blank or phonogram carrier, its motor, the winding-arbor thereof, the winding-key having endwise motion on the shaft, interlocking devices connected with the shaft and key to interlock the same, and the producer or reproducer, of a lever having bearing on the winding-key at or about at its point of interlocking with the winding-shaft and adapted to drop on said winding-shaft when the key is moved out of engagement therewith, said lever being provided with a projection in the path of the governor or fly of the motor when said lever rests on the winding-key, and an auxiliary lever actuated by the motor-locking lever and adapted to hold the producer or reproducer away from the carrier when said motor-locking lever rests on the winding-key, for the purpose set forth.

7. The combination, with the producer or reproducer, the motor-governor, the winding-shaft of the motor, provided with a radial lug or projection $a^3$, and the key D, provided with a flange $d$ and a lug or projection adapted to engage the radial lug $a^3$, and a spring exerting its power to hold said lugs in engagement, of the lever B, provided with the lug or projection $b$, the lever B', provided with the pin $b^2$, and a fulcrum common to both levers, for the purposes set forth.

In testimony whereof I affix my signature in presence of two witnesses.

VINZENZ LAHOLA.

Witnesses:
W. B. MURPHY,
CARL ZOUETS.